United States Patent
Croguenec

(10) Patent No.: US 9,797,533 B2
(45) Date of Patent: Oct. 24, 2017

(54) FLEXIBLE JOINT FOR HYDROCARBON PIPES, A METHOD OF DETECTING A LEAK IN SUCH A JOINT, AND A SYSTEM FOR DETECTING A HYDROCARBON LEAK IN SUCH A JOINT

(71) Applicant: TECHLAM SAS, Cernay (FR)

(72) Inventor: Pierre Croguenec, Thann (FR)

(73) Assignee: TECHLAM SAS, Cernay (FR)

( * ) Notice: Subject to any disclaimer, the term of this patent is extended or adjusted under 35 U.S.C. 154(b) by 0 days.

(21) Appl. No.: 14/513,288

(22) Filed: Oct. 14, 2014

(65) Prior Publication Data
US 2015/0137506 A1 May 21, 2015

(30) Foreign Application Priority Data

Oct. 14, 2013 (FR) ...................................... 13 59957

(51) Int. Cl.
*F16L 27/107* (2006.01)
*G01M 13/00* (2006.01)
*G01M 3/18* (2006.01)
*F16L 27/103* (2006.01)

(52) U.S. Cl.
CPC .......... *F16L 27/107* (2013.01); *F16L 27/103* (2013.01); *G01M 3/183* (2013.01); *G01M 13/005* (2013.01); *F16L 2201/30* (2013.01)

(58) Field of Classification Search
CPC ... F16L 27/107; F16L 27/103; F16L 2201/30; G01M 13/005; G01M 3/183
See application file for complete search history.

(56) References Cited

U.S. PATENT DOCUMENTS

| 4,183,556 A | | 1/1980 | Schwemmer | |
|---|---|---|---|---|
| 4,515,399 A | * | 5/1985 | Sullivan | E21B 17/085 285/146.3 |
| 5,090,871 A | | 2/1992 | Story et al. | |
| 5,133,578 A | * | 7/1992 | Whightsil, Sr. | E21B 17/085 277/626 |
| 5,648,614 A | * | 7/1997 | Martsfeld | F16J 15/326 73/706 |

(Continued)

FOREIGN PATENT DOCUMENTS

| DE | GB 2524738 A | * 10/2015 | ............ G01M 3/045 |
|---|---|---|---|
| EP | 1 559 941 | 8/2005 | |

*Primary Examiner* — Rodney Mintz
(74) *Attorney, Agent, or Firm* — Clark & Brody

(57) ABSTRACT

A flexible joint for conveying a fluid in a fluid pipe in order to unite two pipes in leaktight and flexible manner comprises a tubular vessel having an upstream end for flexible and leaktight connection with an upstream tube, a downstream end for leaktight connection with a downstream tube, and a tubular bellows fastened in leaktight manner to the inside of the vessel, thereby defining two concentric spaces that are mutually separated in leaktight manner in normal operation. An inner space is provided in which the fluid flows between the upstream end and the downstream end. A peripheral space is situated between the inner space and a side wall of the vessel and is filled with an incompressible liquid. The joint further includes at least one sensor for detecting a hydrocarbon fluid in the incompressible liquid if the seal is broken between the inner space and the peripheral space.

12 Claims, 4 Drawing Sheets

(56) References Cited

U.S. PATENT DOCUMENTS

| | | | | |
|---|---|---|---|---|
| 5,905,212 | A * | 5/1999 | Moses | F16F 1/393 73/862.043 |
| 5,951,061 | A * | 9/1999 | Arlt, III | E21B 17/085 192/110 R |
| 6,112,579 | A * | 9/2000 | Tryba | G01M 3/16 73/40.5 R |
| 6,459,995 | B1 * | 10/2002 | Collister | G01N 33/2888 702/104 |
| 6,592,126 | B2 * | 7/2003 | Davis | F16J 15/004 137/312 |
| 7,042,235 | B2 * | 5/2006 | Strackbein | G01M 3/182 324/686 |
| 7,341,283 | B2 * | 3/2008 | Moses | E21B 17/085 285/223 |
| 7,506,896 | B2 * | 3/2009 | Richer De Forges | E21B 17/085 285/225 |
| 7,509,841 | B2 * | 3/2009 | Spaolonzi | G01M 3/047 138/104 |
| 7,631,697 | B2 * | 12/2009 | Bhavsar | B82Y 15/00 166/179 |
| 7,782,062 | B2 * | 8/2010 | Bier | G01M 3/165 324/525 |
| 8,016,324 | B2 * | 9/2011 | Gutierrez-Lemini | E21B 17/085 285/146.3 |
| 8,038,177 | B2 * | 10/2011 | Gutierrez-Lemini | F16L 27/103 285/223 |
| 8,128,129 | B2 * | 3/2012 | Gutierrez-Lemini | F16L 27/103 285/146.3 |
| 8,479,585 | B2 * | 7/2013 | Shaw-Klein | H01L 41/081 73/777 |
| 8,602,065 | B2 * | 12/2013 | Aulanko | G01M 3/18 116/266 |
| 2005/0062487 | A1 | 3/2005 | Strackbein et al. | |
| 2005/0167978 | A1 * | 8/2005 | Moses | E21B 17/085 285/223 |
| 2008/0139322 | A1 * | 6/2008 | Forges | E21B 17/085 464/88 |
| 2008/0157477 | A1 * | 7/2008 | Gaus | A47L 15/421 277/320 |
| 2009/0000381 | A1 | 1/2009 | Allison et al. | |
| 2009/0212557 | A1 * | 8/2009 | Gutierrez-Lemini | E21B 17/085 285/148.3 |
| 2011/0042936 | A1 * | 2/2011 | Andrews | F16L 27/0832 285/94 |
| 2012/0055257 | A1 * | 3/2012 | Shaw-Klein | H01L 41/081 73/780 |
| 2013/0160886 | A1 * | 6/2013 | Wright, Jr. | F16L 55/16 138/97 |
| 2014/0260690 | A1 * | 9/2014 | Corder | G01L 9/0072 73/862.626 |
| 2016/0038940 | A1 * | 2/2016 | Babcock | B81C 1/00206 422/68.1 |
| 2016/0251910 | A1 * | 9/2016 | Ptak | E21B 43/0107 |
| 2016/0348819 | A1 * | 12/2016 | Patrick | F16L 27/103 |
| 2016/0363555 | A1 * | 12/2016 | Kang | G01N 27/227 |

* cited by examiner

FLEXIBLE JOINT FOR HYDROCARBON PIPES, A METHOD OF DETECTING A LEAK IN SUCH A JOINT, AND A SYSTEM FOR DETECTING A HYDROCARBON LEAK IN SUCH A JOINT

The invention relates to a flexible joint for hydrocarbon pipes, to a method of detecting a leak in such a joint, and to a system for detecting a hydrocarbon leak in such a joint.

The development of drilling at great depths (greater than 1000 meters (m)) has led to using floating production storage and offloading (FPSO) unit platforms. Such barges are connected to wells by metal pipes known as "risers" that enable crude hydrocarbons to be brought to the surface. Other pipes are used for injecting water or gas into wells or for transferring oil that has been processed to transport means (ships, pipelines . . . ).

Such pipes are constituted as an assembly of steel tubes that are joined together end to end. One of the ends of the pipe is connected to the FPSO by a flexible joint suitable for accommodating varying angles between the pipe and the FPSO in order to limit the stresses on the pipe in the event of the FPSO moving.

The flexible joint is mounted on the FPSO platform. Depending on the extent to which the tanks on board the platform are filled, the flexible joint may be underwater or above water. Nevertheless, the depth to which it might be immersed does not exceed a few meters.

In general manner, an existing flexible joint comprises a tubular vessel provided with an upstream end for flexible and leaktight connection with an upstream tube, and a downstream end for leaktight connection with a downstream tube.

In such a joint, the upstream end is an open end that supports, on the inside of the vessel, a flexible frustoconical abutment for receiving in leaktight manner a flared end of an upstream fluid inlet pipe (for delivering hydrocarbon).

The downstream end is a cover mounted in removable and leaktight manner on the tubular vessel and comprising, towards the inside of the vessel, a tubular stop substantially facing the flexible frustoconical abutment, and towards the outside of the vessel, a connection tube for connecting to a downstream fluid outlet pipe.

On pipes that might be subjected to explosive decompression, the frustoconical abutment is a rubber/metal laminate and it is protected from hydrocarbons by a metal bellows (bellows made of Inconel).

The bellows is tubular, and fastened in leaktight manner firstly to the cover around the tubular stop, and secondly to the flared end of the upstream fluid inlet pipe, which is pressed against the frustoconical abutment. The bellows thus defines two spaces that are sealed relative to each other in normal operation: an inner space situated inside the bellows and through which the fluid flows; and a peripheral space situated between the bellows, the cover, the side wall, and the frustoconical abutment, and filled with incompressible liquid.

A break in the sealing of the metal bellows (crack, . . . ) leads to the vessel of the flexible joint being polluted by hydrocarbons that run the risk of damaging the frustoconical abutment made of rubber/metal laminate and thus potentially to the risk of causing the joint to break in the event of explosive decompression, with that being followed by the surroundings being polluted.

In order to avoid that, flexible joints are regularly inspected to make sure that the frustoconical abutment made of rubber/metal laminate is intact.

Nevertheless, that does not prevent accidents. Also, inspecting a metal bellows requires the joint to be disassembled and operation of the pipe to be stopped, where stopping operation represents a very large financial penalty.

The present invention thus seeks to enable maintenance of the flexible gasket to be tracked in reliable manner, without requiring oil production to be interrupted, and capable of withstanding operating stresses (pressure, temperature) and environmental stresses relating to using the joint (seawater and corrosive substances).

The invention proposes providing a flexible joint with at least one sensor for detecting the fluid (hydrocarbon) in an incompressible liquid, and for generating a signal in the event of such detection.

For this purpose, the invention provides a flexible joint for a pipe conveying a fluid, such as a hydrocarbon, in order to unite two pipes in leaktight and flexible manner, the joint comprising a tubular vessel provided:

with an upstream end for flexible and leaktight connection with an upstream tube;

with a downstream end for leaktight connection with a downstream tube; and with a tubular bellows fastened in leaktight manner to the inside of the vessel, thereby defining two concentric spaces that are mutually separated in sealed manner in normal operation: an inner space in which the fluid flows between the upstream end and the downstream end, and a peripheral space situated between the inner space and a side wall of the vessel, and filled with an incompressible liquid;

the joint further including at least one sensor for detecting fluid in the incompressible liquid in the event of sealing being broken between the inner space and the peripheral space.

In other embodiments:

the upstream end may be an open end that supports on the inside of the vessel a flexible frustoconical abutment for receiving in leaktight manner a flared end of an upstream fluid inlet pipe;

the downstream end may be a cover mounted in removable and leaktight manner on the tubular vessel and comprising, towards the inside of the vessel, a tubular stop substantially facing the flexible frustoconical abutment, and towards the outside of the vessel, a connection tube for connecting to a downstream fluid outlet pipe;

the tubular bellows that may be leaktight against the fluid is fastened in leaktight manner firstly to the cover around the tubular stop, and is for fastening secondly to the flared end of an upstream fluid inlet tube pressing against the frustoconical abutment, thereby defining two spaces that are sealed from each other in normal operation: an inner space situated inside the bellows and through which the fluid flows; and a peripheral space situated between the bellows, the cover, the side wall, and the frustoconical abutment, and filled with incompressible liquid;

the sensor for detecting hydrocarbon fluid in an incompressible liquid may be an electrical sensor;

the sensor for detecting fluid in an incompressible liquid may be an electrical sensor selected from a resistive sensor and a capacitive sensor;

the sensor may be a capacitive sensor having first and second electrodes separated by a material of permittivity that is low relative to the permittivities of the fluid and of the incompressible liquid;

the electrodes may be circular and may be arranged concentrically;

the electrodes may be made of copper and the low permittivity material may be polyether ether ketone; and/or the flexible joint may include a plurality of sensors, all situated in the peripheral space in order to define a plurality of distinct detection zones therein.

The invention also provides a method of detecting fluid, such as a hydrocarbon, in an incompressible liquid in a flexible joint of a pipe for conveying a fluid as described above, the method comprising the following steps:

a) uniting two fluid tubes in leaktight and flexible manner with the help of a flexible joint according to the invention;

b) activating at least one of the sensors for detecting fluid in the incompressible liquid of the flexible joint;

c) collecting the data coming from the sensor(s);

d) transmitting the data collected in step c) to a control module capable of processing the collected data, of generating a processing result, and of issuing an alarm signal if the processing result is consistent with detecting a mixture of fluid and of incompressible liquid in the joint.

The steps b) to d) may be performed continuously or on request.

The invention also provides a system for detecting a mixture of a fluid, such as a hydrocarbon, in an incompressible liquid in a flexible joint of a pipe for conveying a fluid as described above, the system comprising:

an above-described flexible joint;

a data acquisition and preprocessing module for acquiring and preprocessing data coming from the sensor(s) placed in the flexible joint and capable of generating preprocessed data;

a transmission module for transmitting pre-processed data;

an inspection module capable of processing the data transmitted by the transmission module, of generating a processing result, and of issuing an alarm signal if the processing result is consistent with detecting a mixture of fluid and of incompressible liquid in the joint; and an electrical power supply connected to the data acquisition and reprocessing module, to the transmission module, to the inspection module, and optionally to the sensors that are placed in the flexible joint.

In other embodiments:

the data acquisition and preprocessing treatment module and the transmission module may be arranged outside the joint, and the inspection module and the electrical power supply may be arranged at a distance from the joint;

the transmission module may be a cable connection between the data acquisition and preprocessing module and the inspection module;

the transmission module may be a wireless module and comprise a first transceiver of sound waves for communicating the preprocessed data in water to a second soundwave transceiver coupled to a transducer for transforming the sound waves into electromagnetic waves, itself coupled to a first transceiver of electromagnetic waves for providing communication in air, the inspection module including a second electromagnetic wave transceiver; and/or the detection system may further comprise a memory for storing data from the sensor(s) placed in the flexible joint and/or the data preprocessed by the data acquisition and preprocessing module.

Thus, by detecting the presence of hydrocarbon in an incompressible liquid, it is possible to deduce therefrom a severe break in the sealing of the metal bellows that may require production to be stopped and the bellows to be replaced.

Other characteristics of the invention appear from the following detailed description made with reference to the accompanying drawings, in which.

Figures 1, 2:
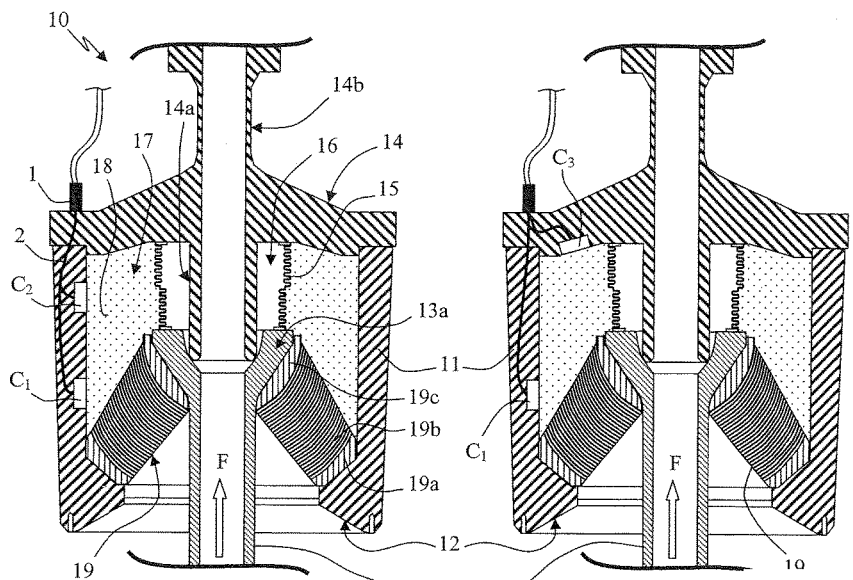
FIG. 1 is a diagrammatic view in section of a first embodiment of the invention in which the sensors are arranged in the tubular vessel.
FIG. 2 is a diagrammatic view in section of a second embodiment of the invention in which at least one sensor is arranged in the cover of the joint towards the inside of the vessel.

The two embodiments of FIGS. 1 and 2 show a flexible pipe joint 10 for conveying a fluid F, such as a hydrocarbon, the joints uniting two pipes in leaktight and flexible manner.

The joint 10 comprises a tubular vessel 11 provided with an upstream end 12 for flexible and leaktight connection to an upstream tube 13, and with a downstream end 14 for leaktight connection to a downstream tube (not shown).

The tubular vessel also comprises a tubular bellows 15 fastened in leaktight manner to the inside of the vessel 11, thereby defining two concentric spaces that are mutually separated in sealed manner in normal operation: an inner space 16 in which the fluid F flows between the upstream end 12 and the downstream end 14; and a peripheral space 17 situated between the tubular bellows 15 and the side wall 11 of the vessel.

The peripheral space 17 is filled with an incompressible liquid 18, generally an antifreeze, preferably comprising an ethylene glycol and one or more additives.

More precisely, each of the flexible joints shown in FIGS. 1 and 2 presents an upstream end 12 constituted by an open bottom that supports towards the inside of the vessel 11 a flexible frustoconical abutment 19 for receiving in leaktight manner the flared end 13a of the upstream fluid inlet pipe 13.

The frustoconical abutment 19 is generally constituted by an outer support 19a in leaktight contact with the vessel 11, by a laminate 19b comprising layers of rubber alternating with rigid strength members, and by a frustoconical inner support 19c adapted to come into leaktight contact with the flared end 13a of the upstream pipe 13.

The end 14 of the joint is a cover mounted in removable and leaktight manner on the tubular vessel 11.

Towards the inside of the vessel 11, the cover 14 has a tubular stop 14a substantially facing the flexible frustoconical abutment 19, and towards the outside of the vessel 11, it has a connection tube 14b for connecting to a downstream fluid outlet tube (not shown).

In the embodiments shown, the tubular bellows 15 that is leakproof against the fluid F is fastened in leaktight manner firstly to the cover 14 around the tubular stop 14a, and secondly to the flared end 13a of the upstream fluid inlet pipe 13, which is pressed against the frustoconical abutment.

The tubular stop 14a of the cover 14 holds the flared end of the upstream pipe against the frustoconical abutment 19.

Nevertheless, even if it is held strongly enough for the upstream pipe to remain pressed against the frustoconical abutment 19 in use, the contact between the tubular stop and the flared end is not leaktight.

Thus, in use, fluid is to be found between the tubular bellows 15 and the tubular stop 14a This arrangement thus defines two spaces that are sealed relative to each other in normal operation: an inner space 16 situated inside the bellows and through which the fluid flows; and a peripheral space 17 situated between the bellows 15, the cover 14, the side wall 11, and the frustoconical abutment 19.

In accordance with the invention, the flexible joint includes at least one sensor for detecting a mixture of fluid F and of incompressible liquid in the event of sealing being broken between the inner space 16 and the peripheral space 17.

It is preferable for the sensors to be provided redundantly. It is thus possible to limit any risk of erroneous detection in the event of a sensor deteriorating, thereby reducing the risk of a false alert. Furthermore, by using a plurality of sensors, and thus by inspecting a plurality of zones, it is easier to estimate the amplitude and the propagation of a leak.

In FIG. 1, the joint has two detection sensors C1 and C2 situated in the peripheral space 17 and housed in the inside wall 11 of the vessel.

The sensors are connected to a connector 1 by electrical connections 2, represented in this example in the form of cables.

Alternatively, they could naturally be rigid metal tracks that are insulated from the vessel.

The connector 1 may serve to power the sensors electrically and/or to transmit data coming from the sensors.

By placing a plurality of sensors in the vessel 11, a plurality of distinct detection zones are defined, thereby making it possible to evaluate the amplitude and the propagation of a leak, where such a leak will generally be situated in the tubular bellows (through cracks in the bellows itself via cracks, or where the bellows is fastened to the cover or to the end of the upstream tube).

Naturally, the sensors may be arranged over the entire periphery of the vessel and not only on one side as shown in order to avoid overcrowding the figures.

Given that the flowing fluid is generally at a pressure higher than the pressure of the liquid 18, the detected mixture will be a mixture of a small quantity of hydrocarbon in the incompressible liquid 18.

Since a leak is generally situated very close to the tubular bellows, it may be desirable to provide a sensor C3 (see FIG. 2) that is situated at the downstream end of the leaktight connection to a downstream tube, e.g. on the cover 14, as close as possible to the fastening of the bellows.

The electrical sensors usable in the context of the invention are resistive sensors and, advantageously, capacitive sensors.

The sensors C1, C2, and C3 shown in FIGS. 1 and 2 may be capacitive sensors.

The electrical sensors rely on the principle that the values of the electrical characteristics (permittivity and/or conductivity) of the surrounding media (hydrocarbons and/or incompressible liquids) are modified as a function of the nature of the surrounding media.

The sensors present the advantage of not requiring any direct contact between the sensor and the medium in order to enable reliable measurements to be taken.

Nevertheless, measurement can be performed only via a material having suitable electrical characteristics (an electrical insulator).

Figures 3, 4:
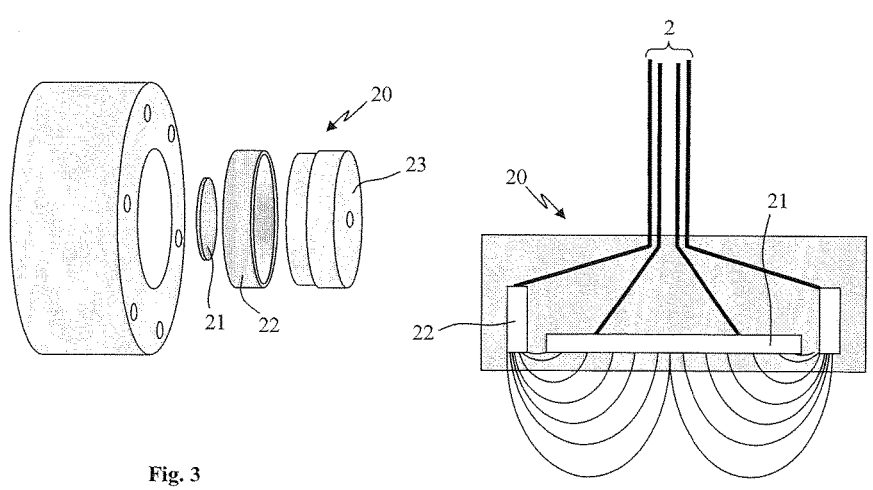
FIG. 3 is a diagrammatic view in perspective of a capacitive sensor advantageously used in a flexible joint of the invention.
FIG. 4 is a diagrammatic view in section of the FIG. 3 sensor.

An example of an electrical sensor is shown in FIGS. 3 and 4.

A capacitive sensor 20 suitable for use in the context of the invention presents a first electrode 21 and a second electrode 22 that are separated by a material 23 of permittivity that is low relative to that of the fluid and of the incompressible liquid.

In the context of the invention, a material of low permittivity corresponds to a material having a dielectric constant lying in the range 0 to 5. The permittivity of the material used must be close to that of the fluid to be detected.

The electrodes 21 and 22 are circular and they are arranged concentrically (see FIG. 4).

In particular, the electrode 21 is a disk and the electrode 22 is a ring.

Advantageously, the electrodes are made of copper and the low permittivity material 23 is polyether ether ketone (PEEK).

This concentric arrangement serves to limit the overall size of the sensor.

PEEK is a substance that chemically withstands the liquids present, and it presents mechanical strength suitable for the operating stresses of a flexible joint at sea for a pipe conveying a hydrocarbon fluid under pressure.

Advantageously, the PEEK may be filled with glass fibers in order to improve the mechanical strength of the sensor.

Also, PEEK chemically withstands the incompressible liquids conventionally used, comprising glycol or the antifreezes that are normally used in the car industry.

It is generally possible to use capacitive proximity sensors such as the KA0268 detector from the supplier Rechner Sensors.

This type of detector presents the advantage of having sensitivity that can be adjusted by means of a potentiometer, thereby enabling it to be adapted to any type of liquid.

Tests have been carried out with KA0268 detectors, and the permittivities and the conductivities of two hydrocarbons and of two incompressible barrier liquids 18 have been measured as a function of the excitation frequency of the sensor and of the temperature of the liquid.

Figure 5:
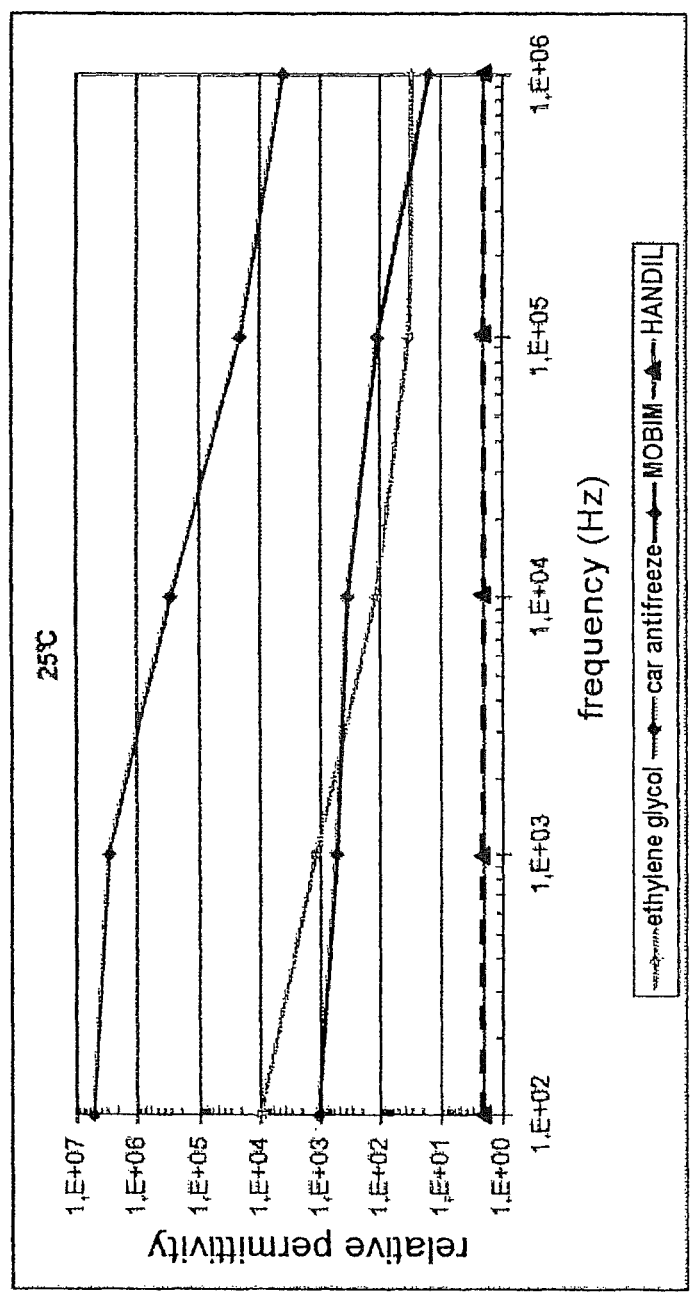
FIGS. 5 and 6 are graphs showing how relative permittivity varies as a function of frequency for temperatures in the range 25° C. to 90° C.
Figure 6:
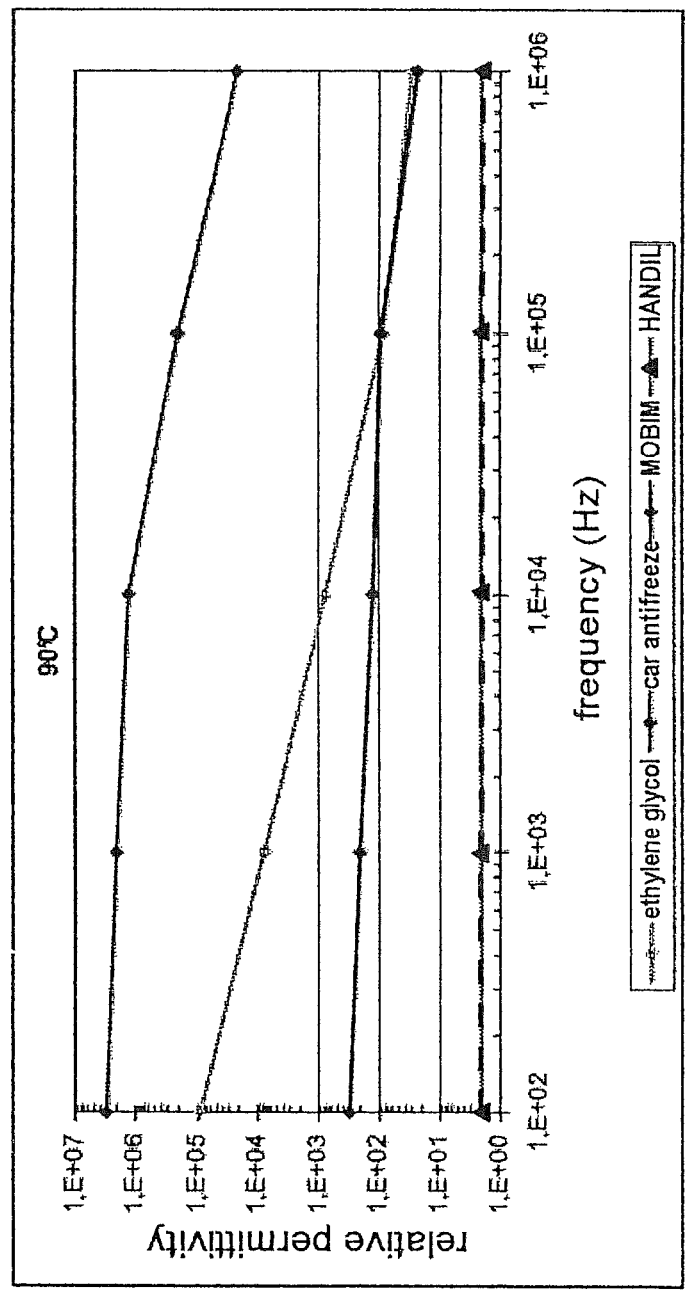

The graphs of FIGS. 5 and 6 show how relative permittivity varies as a function of frequency for temperatures in the range 25° C. to 90° C.

These graphs show that for all the liquids tested (hydrocarbons: low aromatic content MOBIM, and high aromatic content HANDIL; barrier liquids: ethylene glycol and car antifreeze), the more the frequency increases, the more the permittivity decreases.

A sensor excitation frequency of less than 3 kilohertz (kHz) provides good control by measuring more accurately the presence of hydrocarbons in the incompressible liquid.

Also, it is found that using car antifreeze as the incompressible liquid provides a clear distinction with hydrocarbons, and thus enables a mixture of hydrocarbons in the incompressible liquid (car antifreeze) to be detected more accurately.

It is preferable to measure permittivity, since measuring conductivity requires direct contact between the liquid and the electrodes.

A flexible joint of the invention thus makes it possible to detect a mixture of fluid, such as a hydrocarbon, and the incompressible liquid.

This detection comprises the following steps:

a) uniting two fluid pipes in leaktight and flexible manner with the help of a flexible joint of the invention;

b) activating at least one of the detectors for detecting a mixture of fluid and of incompressible liquid;

c) collecting the data coming from the sensor(s);

d) transmitting the data collected in step c) to a control module capable of processing the collected data, of generating a processing result, and of issuing an alarm signal if the processing result is consistent with detecting a mixture of fluid and of incompressible liquid in the joint.

Naturally, steps b) to d) may either be performed continuously and automatically, or else on request and manually, preferably at regular intervals. Inspection may thus be performed at the request of the operators of the platform in the context of periodic verification.

Figure 7:
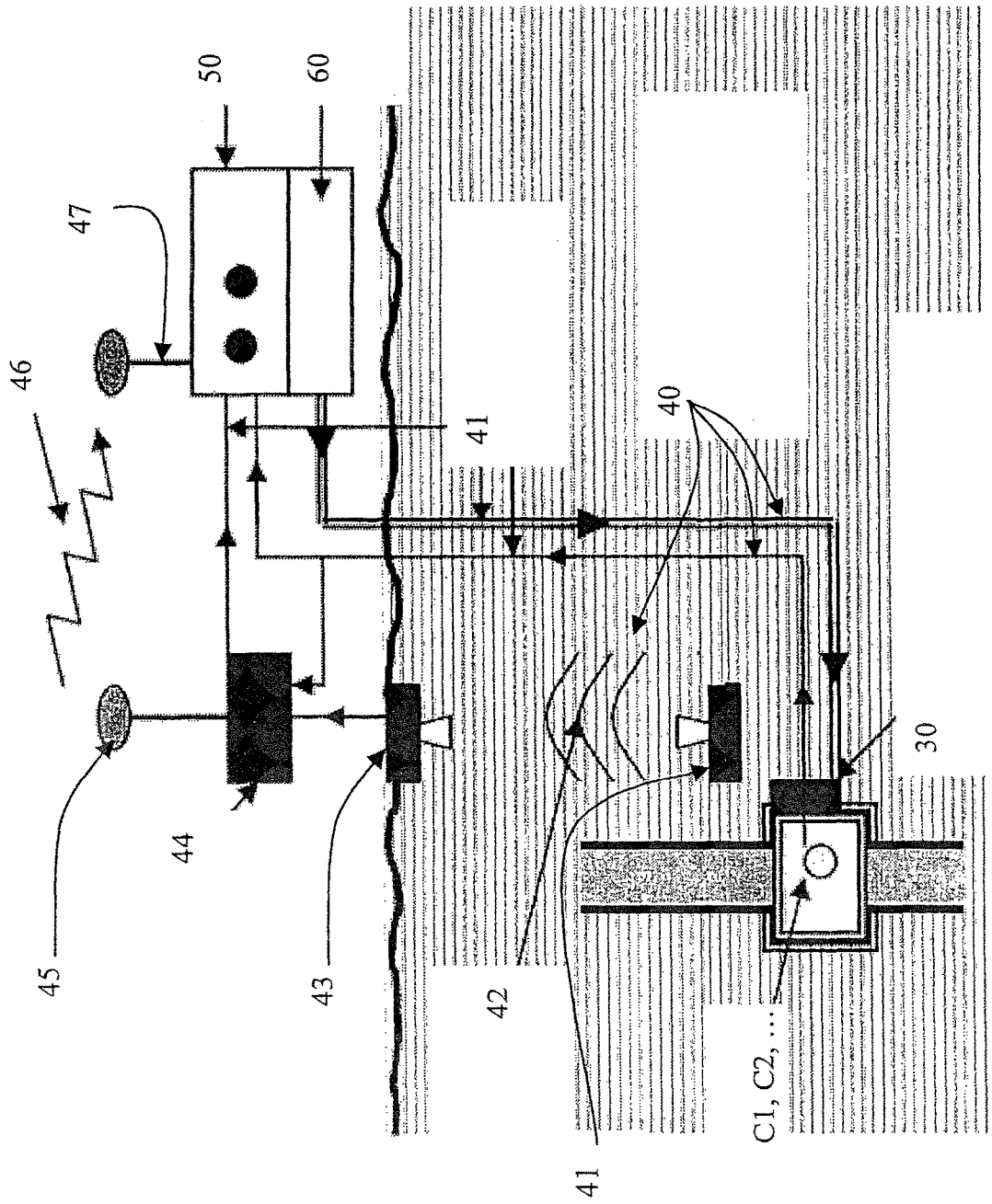
FIG. 7 is a diagrammatic plan view of a detector system of the invention.

In order to perform such detection, the invention proposes a detection system as shown in FIG. 7.

The system comprises:
- a flexible joint of the invention;
- a data acquisition and preprocessing module 30 for acquiring and preprocessing data coming from the sensor(s) placed in the flexible joint 10 and capable of generating preprocessed data;
- a transmission module 40 for transmitting pre-processed data;
- an inspection module 50 capable of processing the data transmitted by the transmission module, of generating a processing result, and of issuing an alarm signal if the processing result is consistent with detecting a mixture of fluid and of incompressible liquid in the joint; and
- an electrical power supply 60 connected to the data acquisition and reprocessing module 30, to the transmission module 40, to the inspection module 50, and optionally to the sensors C1, C2, etc. that are placed in the flexible joint 10. Specifically, depending on the technical options that have been selected, an electrical power supply may also or alternatively be fitted directly to the flexible joint itself. Thus, it may be necessary to have a battery to power the members of the system that are installed on the flexible joint.

Advantageously, the data acquisition and pre-processing treatment module and the transmission module are arranged outside the joint, in the immediate proximity of or on the joint, and the inspection module and the electrical power supply is arranged at a distance from the joint, for example on the FPSO barge.

Such an arrangement makes it possible to avoid reducing the quality of the signal issued by the sensors because of the length of the connection between the sensors and the data acquisition and preprocessing treatment module.

FIG. 7 also shows two possible embodiments for the detection system of the invention.

In a first embodiment, the transmission module 40 is a wired connection by cable 41 between the data acquisition and preprocessing module 30 and the inspection module 50.

When using wired transmission, the information may be optical or electrical. In order to send the information to the platform, it is thus possible to use optical fiber or electric wires.

Alternatively, or in combination (in order to provide data transmission redundancy), the transmission module 40 may be a wireless module.

When using wireless transmission, and depending on the propagation medium, two types of wave may be necessary. Soundwaves enable communication to be performed in water, while electromagnetic waves provide transmission in air.

Thus, the transmission module may comprise a first transceiver 41 for sound waves 42 providing communication through water of preprocessed data to a second soundwave transceiver 43.

The second transceiver 43 is coupled to a transducer 44 that transforms the sound waves into electromagnetic waves.

It is itself coupled to a first transceiver 45 of electromagnetic waves 46 for providing communication in air.

The inspection module 50 then has a second transceiver 47 for electromagnetic waves in order to be able to process the data.

Preferably, the system includes a memory for storing the data from the sensor(s) placed in the joint of the invention.

The memory may also store data preprocessed by the data acquisition and preprocessing module.

Naturally, all of the electrical connections between the sensors and the various elements of the system of the invention should be suitable for the operating conditions of the joint of the invention. For example, the cables may be provided with mechanical protection to guarantee long life.

It is preferable to use connections that are leakproof and protected from chemical and mechanical attacks from the surrounding medium.

It is also possible to provide systems that are redundant in order to limit the risk of total loss of signal or of a signal that is erroneous.

The invention claimed is:

1. A flexible joint (10) for a pipe conveying a fluid (F) in order to unite two pipes in leaktight and flexible manner, the joint comprising a tubular vessel (11) provided:
   with an upstream end (12) for flexible and leaktight connection with an upstream tube (13);
   with a downstream end (14) for leaktight connection with a downstream tube;
   with a tubular bellows (15) fastened in leaktight manner to the inside of the vessel (11), thereby defining two concentric spaces that are mutually separated in leaktight manner in operation: an inner space (16) in which the fluid (F) flows between the upstream end (12) and the downstream end (14), and a peripheral space (17) situated between the inner space (16) and a side wall of the vessel (11), and filled with an incompressible liquid (18);
   the joint further includes at least one capacitive sensor (C1, C2, C3) (20) for detecting fluid in the incompressible liquid (18) in the event of sealing being broken between the inner space (16) and the peripheral space (17), said capacitive sensor (20) having first and second electrodes (21, 22), the first and second electrodes embedded in a material (23) of permittivity that is low relative to permittivities of the fluid (F) and of the incompressible liquid (18), and wherein the first and second electrodes (21, 22) comprise copper and the low permittivity material (23) is polyether ether ketone.

2. The flexible joint according to claim 1, wherein
   the upstream end (12) is an open end that supports on the inside of the vessel (11) a flexible frustoconical abutment (19) for receiving in leaktight manner a flared end (13a) of an upstream fluid inlet pipe (13);
   the downstream end (14) is a cover mounted in removable and leaktight manner on the tubular vessel (11) and comprising, towards the inside of the vessel (11), a tubular stop (14a) substantially facing the flexible frustoconical abutment (19), and towards the outside of the vessel (11), a connection tube (14b) for connecting to a downstream fluid outlet pipe;
   the tubular bellows (15) that is leaktight against the fluid (F) is fastened in leaktight manner firstly to the cover (14) around the tubular stop (14a), and is for fastening secondly to the flared end (13a) of an upstream fluid inlet tube (13) pressing against the frustoconical abutment (19), thereby defining two spaces that are sealed from each other in normal operation: an inner space (16) situated inside the bellows (15) and through which the fluid flows; and a peripheral space (17) situated between the bellows (15), the cover (14), the side wall (11), and the frustoconical abutment (19), and filled with incompressible liquid (18).

3. The flexible joint according to claim 1, wherein the at least one capacitive sensor (C1, C2, C3) (20) for detecting the fluid in the incompressible liquid (18) is an electrical sensor.

4. The flexible joint according to claim 1, wherein the electrodes (21 and 22) are circular and are arranged concentrically.

5. The flexible joint according to claim 1, wherein the at least one capacitive sensor is a plurality of sensors (C1, C2, C3), all situated in the peripheral space (17) in order to define a plurality of distinct detection zones therein.

6. A method of detecting a fluid in an incompressible liquid (18) in a flexible joint of a pipe for conveying the fluid, characterized in that the method comprises the following steps:
 a) uniting two fluid tubes (13) in a leaktight and flexible manner with the flexible joint according to claim 1;
 b) activating the at least one capacitive sensor (C1, C2, C3) (20) for detecting the fluid in the incompressible liquid (18) of the flexible joint (10);
 c) collecting data coming from the capacitive sensor(s);
 d) transmitting the data collected in step c) to a control module (50) capable of processing the collected data, of generating a processing result, and of issuing an alarm signal if theprocessing result is consistent with detecting a mixture of the fluid (F) and of the incompressible liquid (18) in the joint (10).

7. The detection method according to claim 6, wherein steps b) to d) are performed continuously or on request.

8. A system for detecting a mixture of a fluid (F) in an incompressible liquid (18) in a flexible joint of a pipe for conveying the fluid, comprising:
 the flexible joint according to claim 1;
 a data acquisition and preprocessing module (30) for acquiring and preprocessing data coming from the capacitive sensor(s) placed in the flexible joint (10) and capable of generating preprocessed data;
 a transmission module (40) for transmitting the preprocessed data;
 an inspection module (50) capable of processing the data transmitted by the transmission module, of generating a processing result, and of issuing an alarm signal if the processing result is consistent with detecting the mixture of the fluid (F) and of the incompressible liquid (18) in the joint (10); and
 an electrical power supply (60) connected to the data acquisition and reprocessing module (30), to the transmission module (40), to the inspection module (50), and optionally to the capacitive sensors (C1, C2, C3) (20) that are placed in the flexible joint (10).

9. The detection system according to claim 8, wherein the data acquisition and preprocessing treatment module (30) and the transmission module (40) are arranged outside the joint, and the inspection module (50) and the electrical power supply (60) are arranged at a distance from the joint.

10. The detection system according to claim 8, wherein the transmission module (40) is a cable connection between the data acquisition and preprocessing module (30) and the inspection module (50).

11. The detection system according to claim 8, wherein the transmission module (40) is a wireless module and comprises a first transceiver (41) of sound waves (42) for communicating the preprocessed data in water to a second soundwave transceiver (43) coupled to a transducer (44) for transforming the sound waves into electromagnetic waves, coupled to a first transceiver (45) of electromagnetic waves (46) for providing communication in air, the inspection module (50) including a second electromagnetic wave transceiver (47).

12. The detection system according to claim 8, further comprising a memory for storing at least one of (a) the data from the capacitive sensor(s) placed in the flexible joint (10) and (b) the data preprocessed by the data acquisition and preprocessing module (30).

\* \* \* \* \*